United States Patent [19]

Cook

[11] 3,899,941
[45] Aug. 19, 1975

[54] CONTINUOUSLY-VARIABLE-GEAR-RATIO AUTOMATIC TRANSMISSION

[76] Inventor: John F. Cook, 810 E. Brown Deer Rd., Milwaukee, Wis. 53217

[22] Filed: Jan. 2, 1974

[21] Appl. No.: 430,156

[52] U.S. Cl. .................. 74/781 R; 74/751; 74/782
[51] Int. Cl. ..................... F16h 57/10; F16h 3/74
[58] Field of Search ............... 74/751, 781 R, 782; 188/59

[56] References Cited
UNITED STATES PATENTS

| | | | |
|---|---|---|---|
| 917,729 | 4/1909 | Henriod | 74/781 R |
| 2,380,927 | 8/1945 | Conkle | 74/781 R |
| 2,523,619 | 9/1950 | Grebb | 74/688 |
| 2,754,697 | 7/1956 | Luebking | 74/781 R |
| 2,979,164 | 4/1961 | Altherr | 188/59 |
| 3,447,400 | 6/1969 | Serniuk | 74/782 |

FOREIGN PATENTS OR APPLICATIONS

| | | | |
|---|---|---|---|
| 1,260,802 | 4/1960 | France | 74/751 |

*Primary Examiner*—Samuel Scott
*Assistant Examiner*—P. S. Lall
*Attorney, Agent, or Firm*—John E. Becker

[57] ABSTRACT

A high efficiency automatic transmission having a continuously variable gear ratio is disclosed. The preferred embodiment of the transmission comprises a housing, an input shaft, an output shaft, an intermediate shaft, a plurality of internal gears and a fluid brake or other rotation resistance means at one end of the intermediate shaft. The transmission end of the input shaft is fixedly attached to a orbital gear carrier which carries a plurality of orbital gears. The orbital gears drive an intermediate driven gear fixed to one end of the intermediate shaft. A one way drive means carried by the intermediate shaft drives a gear train when engaged. An output ring gear fixed to the output shaft is driven both by the orbital gears and by the gear train.

When the input shaft is connected to a source of rotary power, the orbital gear carrier turns with the input shaft, carrying the orbital gears with it. The orbital gears force either the output gear or the intermediate driven gear or both to rotate. Rotation of the intermediate driven gear drives the one way drive means which in turn drives the gear train. Both the gear train and the orbital gears drive the output gear; however, where the torque on the output shaft as reflected through the gear ratios is greater than the torque of the fluid brake, the greatest drive impetus is applied by the gear train.

As the load torque on the output shaft decreases relative to the fluid brake torque, the driving impetus is increasingly produced by the orbital gears. This process can be aided by increasing the braking force applied by the fluid brake to increase resistance to rotation of the intermediate shaft.

Once the output gear speed exceeds that which would be produced by the gear train, the one way drive means disengages and all of the output drive impetus is provided by the orbital gears.

If the intermediate shaft is stopped (either by increasing the brake torque or because the reflected opposing torque of the output load is less than the brake torque), the output obtains maximum speed and the transmission is in a maximum overdrive condition.

10 Claims, 8 Drawing Figures

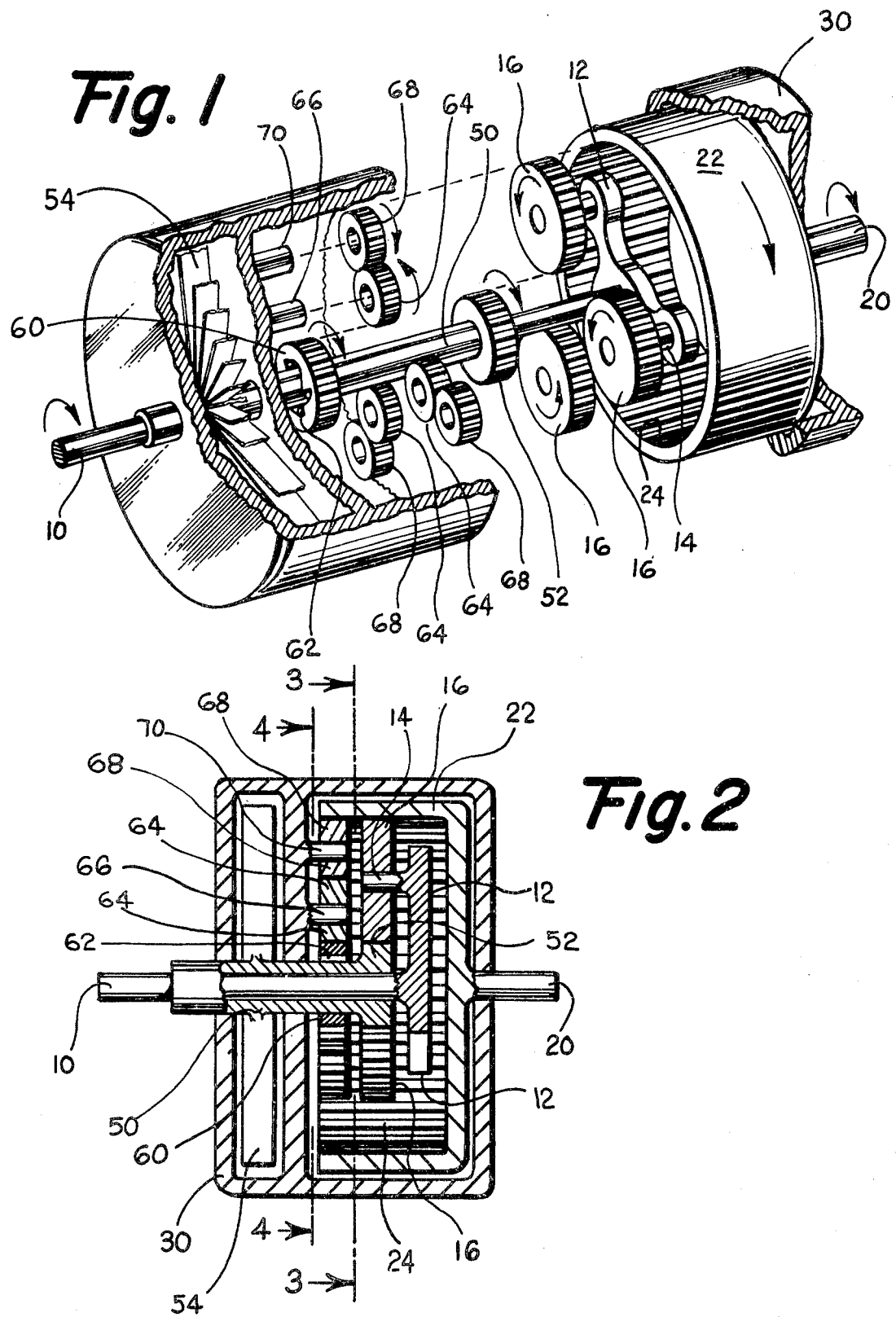

CONTINUOUSLY-VARIABLE-GEAR-RATIO AUTOMATIC TRANSMISSION

BACKGROUND OF THE INVENTION

1. Field of the Invention

This invention relates to the field of rotary transmissions and more particularly to the field of automatic transmissions, especially continuously variable gear ratio transmissions.

2. Prior Art

Automatic transmissions employing orbital gears, sun gears and ring gears are known in the prior art. U.S. Pat. No. 2,523,619 to Grebb discloses one such transmission which however has a minimum gear ratio of unity.

Many prior art automatic transmissions have the disadvantage of requiring complicated fluid logic control systems to control the shifting of gear ratios.

OBJECTS OF THE INVENTION

A primary object of this invention is to provide an automatic transmission having a continuously variable gear ratio which includes gear ratios of less than unity.

Another primary object is to provide such a transmission whose gear ratio is controlled by the input and load torques.

SUMMARY OF THE INVENTION

The above objects are obtained by providing a transmission having input, output and intermediate shafts. The output shaft is driven through both the input and intermediate shafts.

In the preferred embodiment, the input shaft is fixed to an orbital gear carrier which carries a plurality of orbital gears which engage an output ring gear and a driven sun gear on the intermediate shaft. A gear train between the intermediate and output shafts contains a one way drive means and provides a second drive means for the output shaft. A torque means such as a fluid brake is connected to the intermediate shaft to resist its rotation. The maximum gear ratio is obtained when the one way drive means is engaged so that the gear train is driving the output shaft. The minimum gear ratio is obtained when the intermediate shaft is stopped.

The gear ratio of this transmission is determined by the ratio of the input and intermediate shaft speeds and is controlled by the input torque, the fluid brake torque and the load torque.

BRIEF DESCRIPTION OF THE DRAWINGS

FIG. 1 is an exploded view of the preferred embodiment of the invention.

FIG. 2 is a cross section of the preferred embodiment taken through the plane defined by the input and output shafts and a pair of fixed internal shafts.

DETAILED DESCRIPTION OF THE INVENTION

Figure 3:
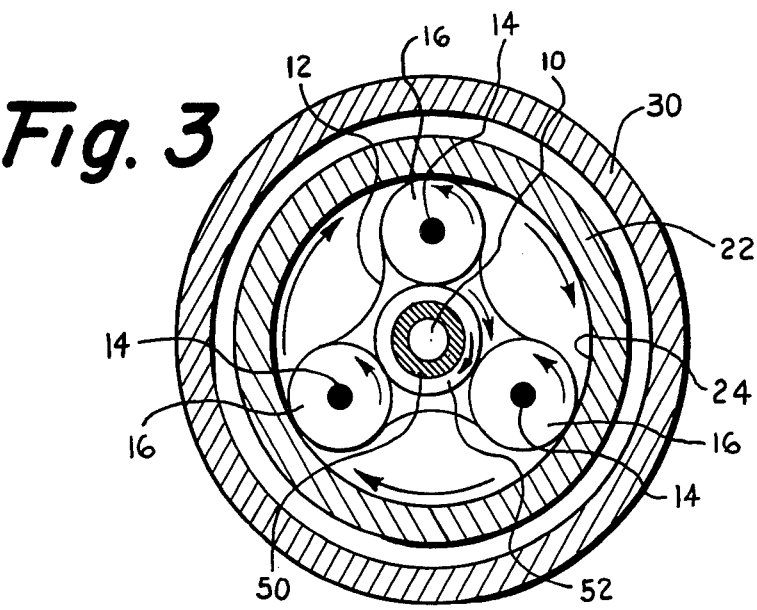
FIG. 3 is a cross section taken along the line 3—3 of FIG. 2 looking in the direction of the arrows.
Figure 4:
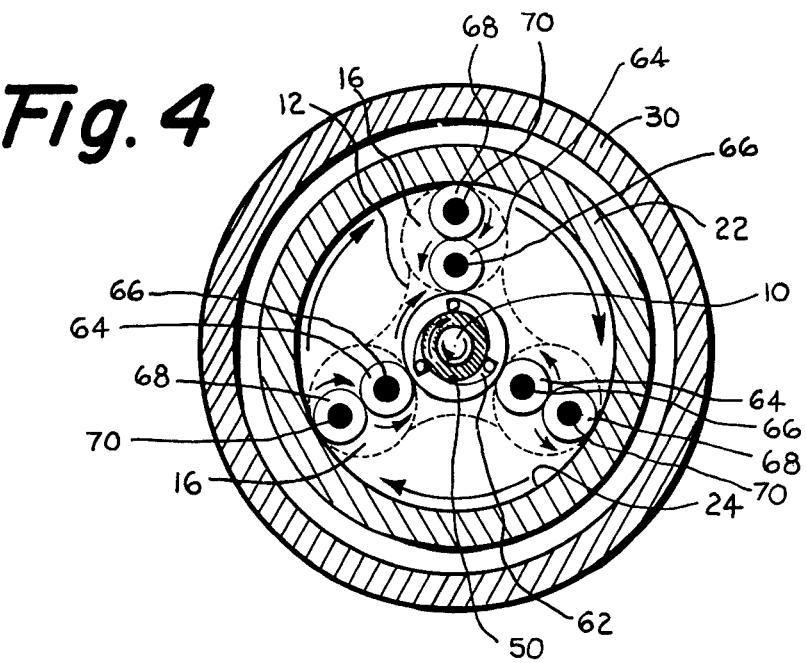
FIG. 4 is a cross section taken along line 4—4 looking in the direction of the arrows, in which the gears shown in FIG. 3 within the output ring gear are shown in phantom for clarity.

As illustrated in FIG. 1, the preferred embodiment of the invention comprises an input shaft 10 and output shaft 20 and a housing 30 containing the transmission gearing. Input shaft 10 has an orbital gear carrier means 12 fixed thereto for rotation with the input shaft.

Gear carrier 12 carries an orbital gear means preferably comprising a plurality of orbital gears. The orbital gear means preferably comprises three shafts 14 upon each of which an orbital gear 16 is free to rotate.

Orbital gears 16 engage an output gear means preferably comprising an output ring gear 22 fixed to output shaft 20 for transmitting power to the output load. Ring gear 22 has a plurality of teeth 24 on its inner surface which engage the teeth of orbital gears 16.

Orbital gears 16 also engage an intermediate driven gear means such as a sun or intermediate driven gear 52 fixed to the intermediate shaft 50 for driving that shaft. Intermediate shaft 50 is hollow and coaxial with input shaft 10 part of which is within intermediate shaft 50.

Intermediate shaft 50 is connected to a torque means which resists rotation of the intermediate shaft. The torque means is illustrated as a fluid brake 54.

Intermediate shaft 50 also drives a gear train means 60 which includes a one way drive means 62. In the preferred embodiment, the one way drive means 62 is carried by shaft 50 and when engaged drives a plurality (preferably three) of gears 64 which are free to rotate on shafts 66 fixed to the transmission housing 30. Gears 64 in turn drive gears 68 which are free to rotate on shafts 70 fixed to housing 30. Gears 68 engage the gear teeth 24 on the inner surface of output ring gear 22. Gear train 60 and intermediate shaft 50 thus constitute a second means for driving output shaft 20.

OPERATION OF THE PREFERRED EMBODIMENT

In order to obtain useful output from the transmission, a rotary power source such as an automobile engine is connected through a clutch to transmission input shaft 10 and a load such as an automobile's drive shaft is connected to output shaft 20. With the engine running at low speed, the clutch is engaged and the input shaft turns at the speed of the engine. Gear carrier 12 rotates with shaft 10 carrying orbital gear shafts 14 with it. Orbital gears 16 rotate at a rate such that the gear sequence comprised of orbital gears 16, intermediate driven sun gear 52 and gear train 60 drives the output ring gear 22 at the same speed as it is driven directly by the orbital gears 16. This provides the highest gear ratio (lowest gear) of the transmission and will be achieved when the one way drive means 62 is engaged. This gear ratio is obtained so long as torque means 54 provides less torque in resistance to rotation of intermediate shaft 50 than the output load torque, both as reflected to a common point such as at orbital gears.

As the inertia of the output load is overcome, its torque (resistance to rotation) decreases. When the output torque load reduces to a level where the orbital gears drive output ring gear 22 faster than it is driven by gear train 60, one way drive means 62 disengages and all drive power is provided by the orbital gear system. Further reduction in the output load torque results in a reduction of the gear ratio as the torque means (fluid brake 54) slows the intermediate shaft.

Thereafter, any further reduction in the output load torque relative to the fluid brake torque causes a further decrease in the gear ratio (a higher gear) until the intermediate shaft stops rotating. When the intermediate shaft stops rotating, the transmission is in its maximum overdrive condition. It will however be understood that the intermediate shaft need not be stopped unless a maximum overdrive condition is desired.

An increase in engine torque (in an attempt to increase speed) increases the torque which must be divided between the output load and the fluid brake. This will cause an increase in the speed of intermediate shaft thus increasing the gear ratio.

ALTERNATE EMBODIMENTS

Figure 5:
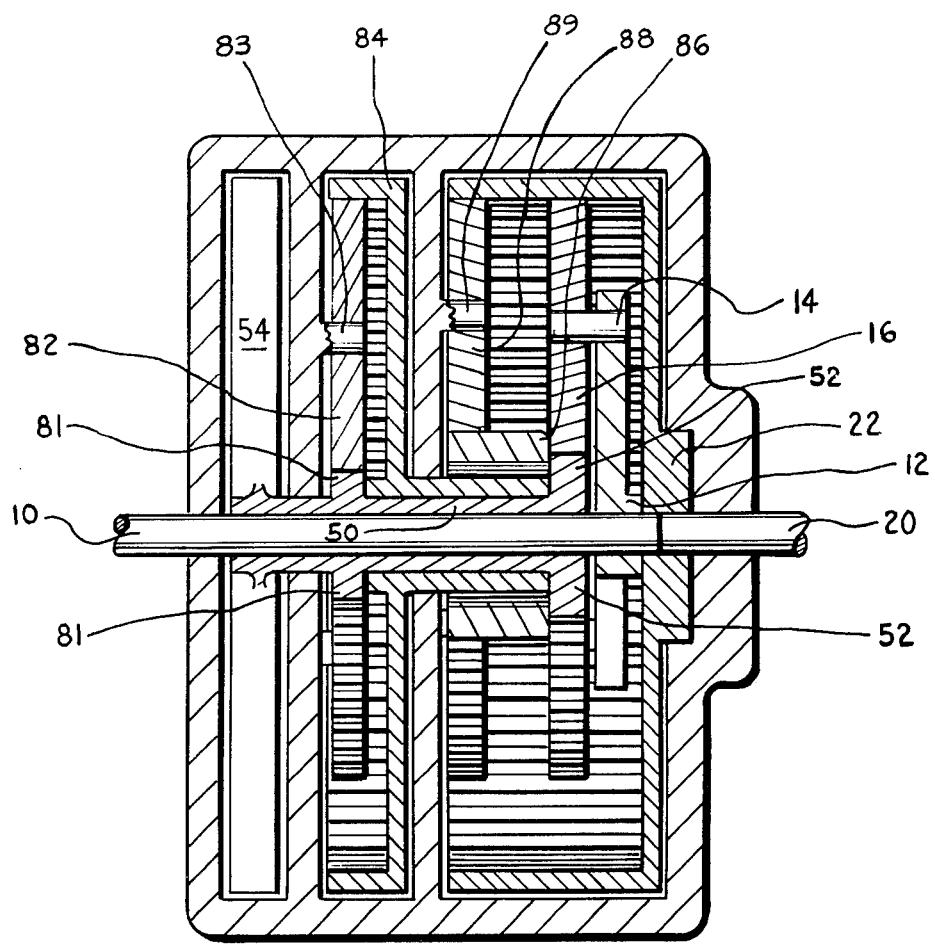
FIG. 5 is a cross section of one alternative embodiment.

FIG. 5 is a cross section of an alternate embodiment of the inventive transmission. This embodiment differs from the preferred embodiment in the configuration of gear train 60. In this alternative, the one way drive means occurs within the gear train rather than on the intermediate shaft at the input to the gear train. The alternate gear train 80 comprises a gear 81 on the intermediate shaft; a gear 82; a ring gear 84 carrying a one way drive means 86; and a plurality of gears 88. Gears 82 and 88 are free to rotate on fixed shafts 83 and 89 respectively. This embodiment achieves a higher ratio in the same diameter housing.

The preferred embodiment is considered superior to this embodiment because it provides a shorter, more compact transmission.

Figure 6:
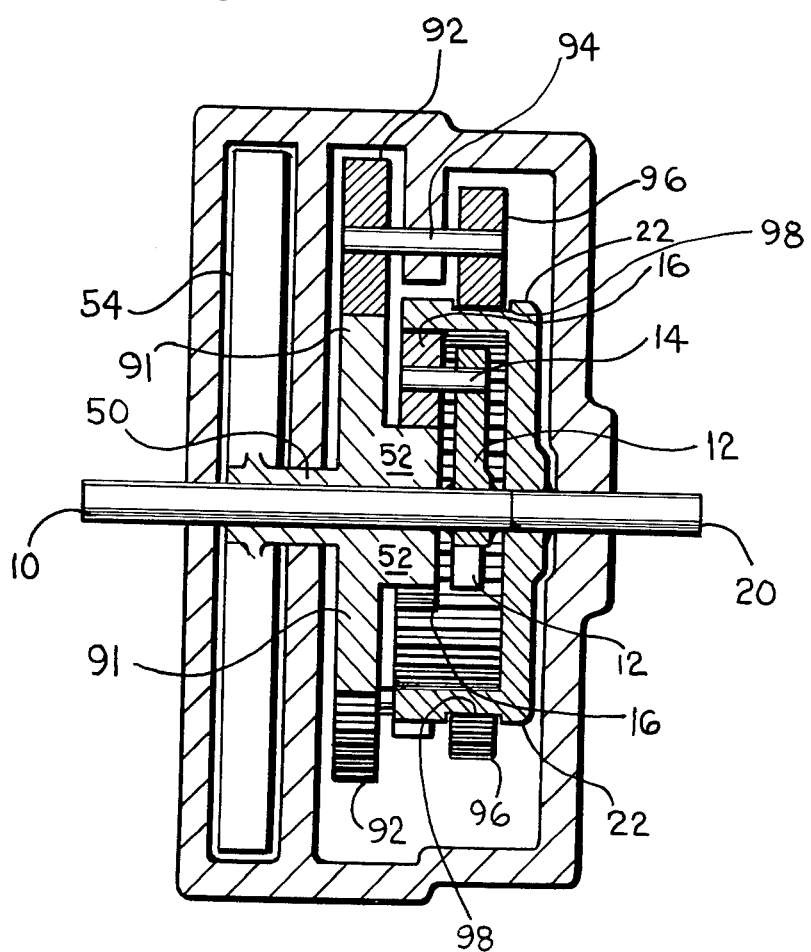
FIG. 6 is a cross section of another alternative embodiment.

Another alternative embodiment is illustrated in FIG. 6. This embodiment differs from the preferred embodiment in configuration of the gear train 60. This alternate gear train 90 is comprised of a gear 91 on the intermediate shaft; a plurality of shafts 94 each having a gear 92 fixed to one end and a gear 96 fixed to the other end; and a one way drive means 98 on the outside of the output ring gear 22. Gear 91 drives gear 92 thus driving shaft 94 and gear 96 which in turn drives one way drive means 98 and thus output gear 22.

This embodiment operates similarly to the preferred embodiment, but produces a larger diameter transmission.

If it is desired to provide manual control of the gear ratio, the fluid brake 54 or other torque means may be made remotely controllable as to the degree of rotational resistance applied to intermediate shaft 50.

Figure 7:
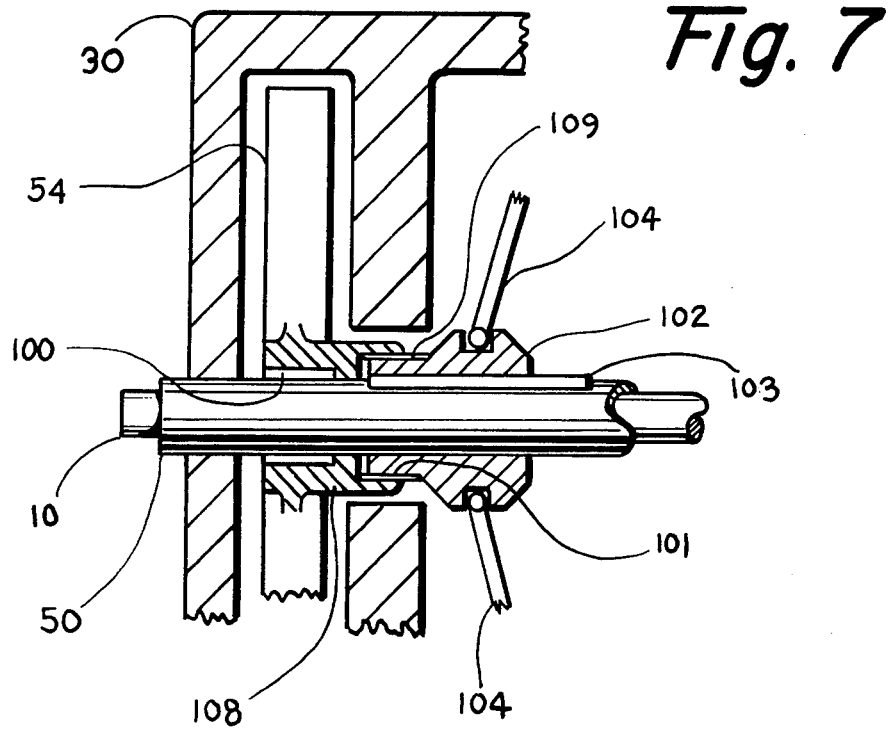
FIG. 7 shows an alternative embodiment of the one way drive means.

In the embodiment of FIG. 7, a free wheeling system is obtained by the introduction of a one way drive means 100 between shaft 50 and fluid brake 54. As output shaft 20 and ring gear 22 drive orbital gears 16, gear 52 and intermediate shaft 50 are driven in opposite rotation from their normal power driven rotation and intermediate shaft 50 turns free of fluid brake 54. Gear carrier 12 is, therefore, not driven and no rotation is caused on input shaft 10, and thus no retarding force is applied to output shaft 20.

In order to permit the selection of the free wheeling system to be controllable, the one way drive means 100 can be rendered inoperative by a control means. An extension 108 of the fluid brake hub is provided with splines, shown at 101, as is extension 109 of slidable clutch collar 102. A key 103 is provided between clutch collar 102 and shaft 50 so that the clutch collar rotates with the shaft. Shift means 104 determines the position of the clutch collar under external control. When the clutch collar 102 is positioned away from the fluid brake 54, it is out of contact with hub extension 108 and the system is free wheeling. When shift means 104 causes the clutch collar to slide into contact with hub 108, the splines cause the hub 108, and hence fluid brake 54, to rotate with shaft 50. In this manner, the one way drive means 100 can be controllably made inoperative. The retarding force of the fluid brake will now cause forces on gear carrier 12 and input shaft 10. In an automotive application, the retarding force of the engine's compression causes a braking force to be applied to output shaft 20.

Figure 8:
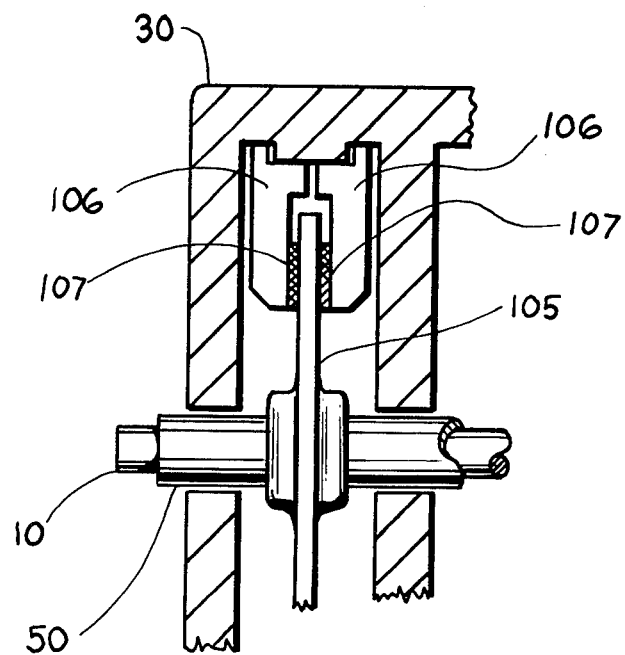
FIG. 8 shows an alternative embodiment involving a positive controllable brake means.

A positive controllable brake means, manual or servo, introduced on intermediate shaft 50 allows its rotation to be retarded or stopped at will. In the embodiment of FIG. 8, a brake disc 105 having brake shoes 107 thereon is keyed to shaft 50 to rotate therewith. Disc brake calipers 106 cooperate with the brake shoes in the conventional manner to slow down or stop the disc rotation under external control. This causes maximum available drag on the output shaft 20 when input shaft 10 is resisting rotation. By varying the amount of drag introduced by the disc brake, a flexible manual "shift up" operative capability is provided. The controllable brake means can be used to provide a "locked in" overdrive condition by causing it to hold intermediate shaft 50 in a stopped condition.

Obviously, many modifications and variations of the present invention are possible in light of the above teachings. It is therefore to be understood that, within the scope of the appended claims, the invention may be practiced otherwise than as specifically described.

What is claimed is:

1. An automatic continuously-variable-gear-ratio transmission comprising:
   a. input shaft means (10) having an orbital gear carrier means (12) fixed thereto;
   b. orbital gear means (14,16) carried by the orbital gear carrier means (12);
   c. intermediate shaft means including an intermediate shaft (50) having intermediate driven gear means (52) fixed thereto;
   d. said intermediate driven gear means (52) being driven by the orbital gear means (16);
   e. torque means (54) connected to the intermediate shaft means for resisting rotation of the intermediate shaft (50);
   f. output gear means (22) engaging the orbital gear means (16);
   g. output shaft means (20) driven by the output gear means (22);
   h. gear train means including an intermediate drive gear (60) drivable by the intermediate shaft (50) and one way drive means (62); and whereby
   i. said gear train means (60) being driven by the intermediate shaft (50) and driving the output gear means (22) when the one way drive means (62) is engaged.

2. The apparatus of claim 1 wherein the one way drive means (62) is carried by the intermediate shaft (50) and the output gear means comprises a ring gear (22) having gear teeth (24) at least on its inner surface, and the gear train comprises a plurality of gears (64,68) in series between the one way drive means (62) and the output ring gear (22).

3. The apparatus of claim 1 wherein the intermediate shaft (50) is hollow and part of the input shaft (10) is within the intermediate shaft.

4. The apparatus of claim 1 wherein the output gear means comprises a ring gear (22) surrounding the orbital gear carrier means (12), the orbital gear means (14,16), the intermediate driven gear (52) and part of the intermediate shaft (50).

5. An automatically continuously variable gear ratio transmission comprising:
   a. an input shaft means (10) having an orbital gear carrier means (12) fixed thereto;
   b. orbital gear means (14,16) carried by the orbital gear carrier means (12);
   c. intermediate shaft means including an intermediate shaft (50) having intermediate driven gear means (52) fixed thereto;
   d. said intermediate driven gear means (52) being driven by the orbital gear means (16);
   e. intermediate drive gear means including intermediate drive gear (81) coupled to the intermediate shaft (50);
   f. torque means (54) fixed to the intermediate shaft means for resisting rotation of the intermediate shaft (50);
   g. gear train means (82–88) engaging the intermediate drive gear (81);
   h. output ring gear means (22) engaging the orbital gear means (16) and the gear train means (82–88);
   i. one way drive means (86 or 98) for allowing said intermediate shaft (50) to rotate in only one direction; and,
   j. an output shaft (20) fixed to the output ring gear (22).

6. The transmission of claim 5 wherein said one way drive means (86 or 98) couples said intermediate drive gear (88 or 92) to said intermediate shaft (50).

7. The transmission of claim 5 wherein said one way drive means (86 or 98) is part of said gear train means (82–88) or (90–96).

8. The transmission of claim 5 wherein said one way drive means (86 or 98) couples said gear train means (82–88) or (90–96) to said output ring gear means (22).

9. The transmission of claim 5 wherein said torque means (54) is fixed to said intermediate shaft (50) by a second one way drive means (100), and further including externally controllable means (104) for rendering said second one way drive means (100) inoperative.

10. The transmission of claim 5 wherein said torque means comprises:
   a disc (105) mounted on said intermediate shaft (50) to rotate therewith;
   brake shoes (107) mounted on said disc (105); and,
   externally controllable disc brake calipers (106) for controllably contacting said brake shoes (107).

* * * * *